April 24, 1956  H. G. VARTANIAN  2,743,329
BRAKE CONDITION SIGNALING DEVICE
Filed Dec. 19, 1952
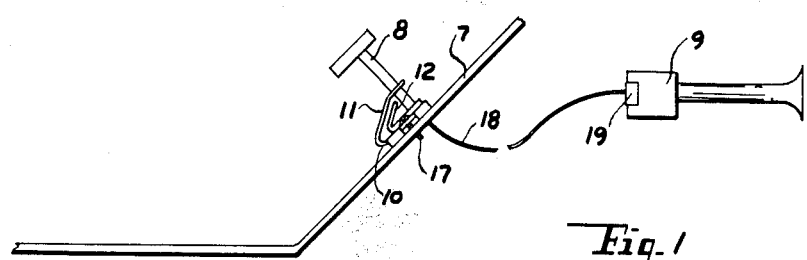
Fig. 1
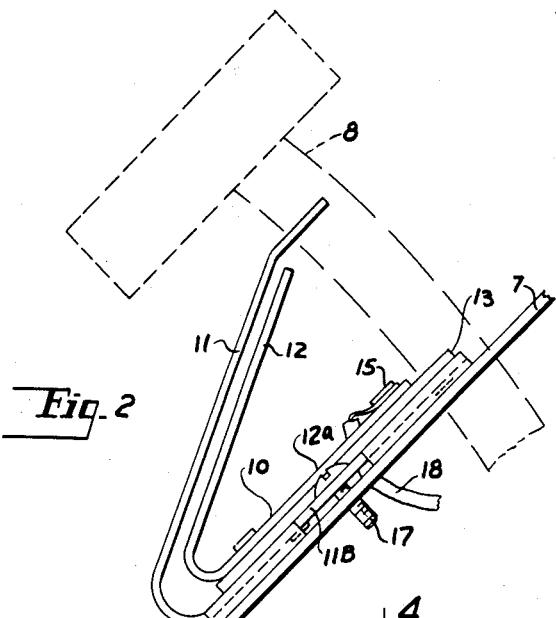
Fig. 2
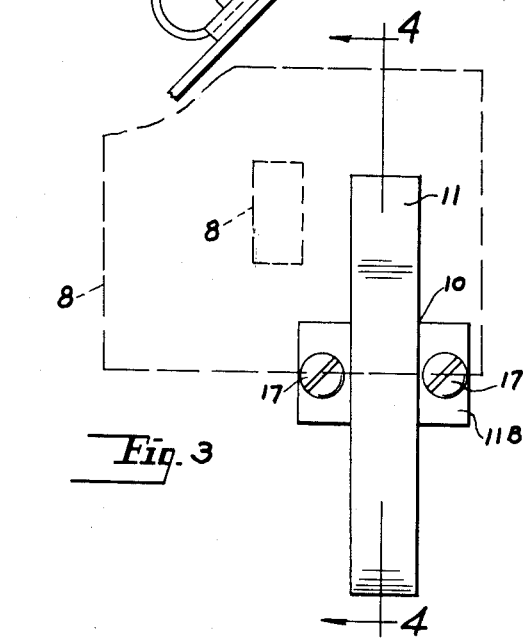
Fig. 3
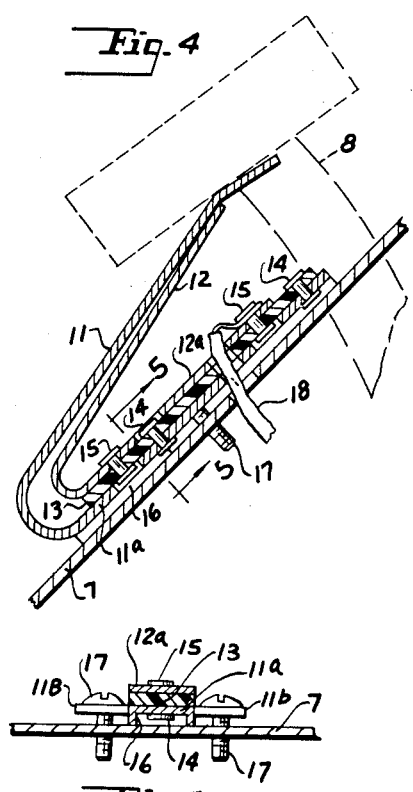
Fig. 4
Fig. 5
INVENTOR.
HAIG G. VARTANIAN.
BY Edward M. Apple
ATTORNEY

United States Patent Office 2,743,329
Patented Apr. 24, 1956

2,743,329

BRAKE CONDITION SIGNALING DEVICE

Haig G. Vartanian, Detroit, Mich.

Application December 19, 1952, Serial No. 326,901

3 Claims. (Cl. 200—61.89)

This invention relates to automobile accessories, and has particular reference to a device for signaling the condition of automobile brakes.

Devices intended for similar purposes have heretofore been known to the public, but the previous devices have been highly complicated, expensive to manufacture, difficult to assemble, and, because of the constant change in models of automobiles from time to time, the previously known devices of this character were not found acceptable by the automobile industry and the driving public.

It is, therefore, an object of this invention to generally improve devices of the character indicated, and to provide a brake signalling device which is simple in construction, inexpensive to manufacture, and one which can be installed on either a new or used automobile within the period of a few minutes, by an ordinary mechanic without the necessity of using any special tools or making any changes in the vehicle.

Another object of the invention is to provide a device which is intended to be combined with the horn circuit of the automobile, whereby an audible signal is given by the horn in the event that the brakes are in a dangerous driving condition, due to worn brake bands, poor adjustment, a leak in the hydraulic lines, or other causes which would permit the brake pedal to travel beyond a predetermined safe position.

Another object of the invention is to provide a device which, when installed on an automobile, will give an audible signal to the driver of the vehicle to notify him that something is amiss in the braking system, while at the same time warning the pedestrians or others who may be in front of the vehicle that the vehicle is not under proper control.

Another object of the invention is to provide a novel switch which may be positioned on the floor board of a vehicle within the area of travel of the brake pedal, whereby a circuit may be closed through the switch upon the downward movement of the brake pedal, without in any manner restricting the travel of the brake pedal.

Another object of the invention is to provide a switch for a device of the character indicated, which is constructed and arranged to co-operate with a vehicle brake pedal to permit the closing of an electric circuit through the switch at some point on the downward travel of the brake pedal and to permit the switch contact elements to continue the downward movement with the brake pedal until the pedal has reached its furthest point of downward travel.

The foregoing and other objects and advantages of the invention will become more apparent as the description proceeds, reference being made from time to time to the accompanying drawings, forming part of the within disclosure, in which drawings:

Fig. 1 is an elevational view of a device embodying the invention, shown in combination with the brake pedal and horn of an automotive vehicle.

Fig. 2 is an enlarged detail in elevation, illustrating the switch employed with my device, with the brake pedal shown in dotted lines and in elevated position.

Fig. 3 is a top plan view of the switch, with broken lines indicating the floor board and the position of the brake lever with reference to the switch.

Fig. 4 is a section taken substantially on the line 4—4 of Fig. 3, showing the switch in circuit closing position, and in compressed condition at one of the lowermost points of travel of the brake pedal.

Fig. 5 is a section taken substantially on the line 5—5 of Fig. 4.

Referring now more particularly to the drawings, it will be understood that in the embodiment herein disclosed, the reference character 7 indicates the floor of an automotive vehicle, having a brake pedal 8 and an electric horn 9, all of which are combined with my novel switch, which is generally designated by the reference character 10, and arranged as hereinafter described.

The switch 10 consists of a pair of flexible spring leaves 11 and 12, which are bent and rebent, as shown in Figs. 1, 2 and 4, and which are insulated from one another by means of a strip of insulation 13. The base members 11A and 12A of the switch contact members 11 and 12 are respectively secured to the insulation strip 13 by means of rivets 14 and 15. The base member 11A is provided with depending flanges 16 (Fig. 5) in order to provide clearance for the rivets 14. The base member 11A is also provided with apertured transverse wings 11B (Figs. 3, 4, and 5) whereby the switch may be secured to the floor 7 by means of screws 17. This automatically grounds the elements 11, 11A and 11B as in the modern vehicle the floor 7 is made of metal. The switch leaf 12 and its base 12A are connected through one of the rivets 15 to a wire 18 which leads to the relay 19 of the horn 9, which is normally connected to the electric system of the motor vehicle, so that when the members 11 and 12 are brought into contact with one another, an electric circuit is closed through the horn 9, thereby giving an audible warning that the brakes of the vehicle are not in safe condition for driving.

One of the important features of this invention resides in the construction of the switch 10, which permits contact to be made between the switch leaves 11 and 12, at a predetermined point on the downward travel of the brake pedal 8, which point would be immediately below the predetermined safe braking position of the brake lever 8, so that immediately upon reaching the earliest unsafe position of the brake pedal 8, the horn circuit will be closed and will remain closed during the remainder of the downward travel of the brake pedal 8. The contact between the leaf members 11 and 12 is a sliding contact, which permits the leaves 11 and 12 to flex downward during the full downward travel of the brake pedal 8, so that if the vehicle brakes are useless, the brake pedal 8 can travel practically to the floor 7 without interference from the switch 10.

It is believed that the operation of the device is obvious from the foregoing description.

Having described my invention, what I claim and desire to secure by Letters Patent is:

1. A switch for a motor vehicle having a body with a metal floor, comprising a channel like base, an insulator, and a pair of substantially V shaped spring conductors arranged in nested relation and supported by said base member, one of the legs of each conductor being secured to said insulator, means on one of said spring conductors for securing thereto a terminal, and common means for securing said base to the floor and for grounding the other conductor to said floor, said base being provided with cutout portions to provide clearance between said base and the means for securing said conductors to said insulator.

2. A switch for a motor vehicle having a body with a metal floor, comprising a channel like base, an insulator, and a pair of substantially V shaped spring conductors arranged in nested relation and supported by said base member, one of the legs of each conductor being secured to said insulator, means on one of said spring conductors for securing thereto a terminal, and common means for securing said base to the floor and for grounding the other conductor to said floor, at least one of said conductors having cut-out portions to provide clearance between said conductor and the means for securing the other conductor to said insulator.

3. A switch for a motor vehicle having a body with a metal floor, comprising a channel like base, an insulator, and a pair of substantially V shaped spring conductors arranged in nested relation and supported by said base member, one of the legs of each conductor being secured to said insulator, means on one of said spring conductors for securing thereto a terminal, and common means for securing said base to the floor and for grounding the other conductor to said floor, there being a cut-out in said insulator and said base to receive a wire conductor connected to said terminal.

References Cited in the file of this patent
UNITED STATES PATENTS

| | | |
|---|---|---|
| 480,340 | Neal et al. | Aug. 9, 1892 |
| 1,261,698 | Carlson | Apr. 2, 1918 |
| 1,303,086 | Lust | May 3, 1919 |
| 1,307,927 | Robinson | June 24, 1919 |
| 1,471,903 | Lindberg | Oct. 23, 1923 |
| 1,797,370 | Rupp | Mar. 24, 1931 |
| 2,031,741 | Smith | Feb. 25, 1936 |
| 2,326,808 | Van Tuyl et al. | Aug. 17, 1943 |